United States Patent [19]

Toman

[11] 4,037,173
[45] July 19, 1977

[54] MULTIPLE CARRIER MODULATION SYNTHESIS

[75] Inventor: Donald J. Toman, Pleasantville, N.Y.

[73] Assignee: Tull Aviation Corporation, Armonk, N.Y.

[21] Appl. No.: 708,923

[22] Filed: July 27, 1976

[51] Int. Cl.² .......................... G01S 1/16; G01S 1/18; H03K 7/08
[52] U.S. Cl. .................................. 332/9 R; 325/142; 332/11 R; 332/21; 332/23 R; 332/40; 343/108 R
[58] Field of Search ............. 332/9 R, 11 R, 21–23 R, 332/40, 41; 343/108 R, 108 M, 108 SM, 109; 325/142

[56] References Cited

U.S. PATENT DOCUMENTS 3,487,411 12/1969 Toman .............................. 343/108 R
3,808,558 4/1974 Toman et al. ........................ 332/9 R Primary Examiner—Siegfried H. Grimm
Attorney, Agent, or Firm—Curtis Ailes

[57] ABSTRACT

Two carriers are gated on and off in an alternating sequence. The same group of different digital sample point values signifying various modulation levels required for each carrier at successive points in time are read out in timed sequence and applied to modify each of the carrier waves by one sample point value during each period when a carrier wave is gated on to thus modify the carriers in a manner recognized by a receiver as modulation.

23 Claims, 2 Drawing Figures

MULTIPLE CARRIER MODULATION SYNTHESIS

CROSS REFERENCES TO RELATED U.S. PATENTS

All of the following related U.S. patents are assigned to the same assignee as the present application:

U.S. Pat. No. 3,793,597 issued Feb. 19, 1974 to Donald J. Toman for MODULATION SYNTHESIS METHOD AND APPARATUS.

U.S. Pat. No. Re. 28,762 issued Apr. 6, 1976 to Donald J. Toman for RADIO NAVIGATIONAL AID WITH SEPARATE STANDARD FREQUENCY SIGNAL. This is a reissue of U.S. Pat. No. 3,806,935 issued Apr. 23, 1974.

This invention relates to a method and apparatus for synthesizing the modulation of at least two different carrier frequencies. The invention is particularly useful for radio transmitting systems for radio navigational aids such as instrument landing systems where fixed tone modulations are to be employed.

In U.S. Pat. No. 3,793,597, issued Feb. 19, 1974, there is described and claimed a modulation synthesis method and apparatus which has been found to be very useful in radio navigational aid transmitters such as microwave instrument landing systems. The present invention is an improvement upon the invention disclosed in that prior patent.

There are certain practical situations where it is necessary to transmit two or more different carrier frequencies, each carrying certain predetermined modulation, from a single apparatus location. For instance, while it is often regarded as most desirable to separate the glide slope and localizer transmitters in aircraft instrument landing systems, in some installations the separation of the two transmitters is not feasible, or does not provide enough advantage to justify the additional expense of separate locations. Therefore, where the two functions are to be served from a single location, it is important to provide the greatest possible efficiency and economy in the installation and in the operation of the apparatus.

Accordingly, it is an important object of the present invention to provide an improved and more economical method and apparatus for generating two different modulated carriers.

It is another important object of the present invention to provide an improved modulation synthesis method and apparatus for synthesizing the modulation of at least two different carriers during substantially concurrent operation.

It is still another object of the present invention to provide an improved method and apparatus for producing two different carriers with synthesized modulation from a single radio carrier frequency source.

Further objects and advantages of the invention will be apparent from the following description and the accompanying drawings.

The invention may be carried out by a method for synthesizing the production of modulated radio carrier waves from at least two radio carriers including continuously storing the same group of different digital sample point values signifying various modulation levels required for each of said radio carriers at successive points in time to suggest the presence of at least one modulation signal waveform for each of said carriers, gating the first of said carriers on and off, gating the second of said carriers on only during the off periods of the first carrier, reading out said sample point values in timed sequence, transferring and applying said digital sample point values to modify said carrier waves in timed sequence by modification of each carrier by one sample point value during each period when each carrier wave is gated on to thus produce modified carriers, the modifications of each of said carriers being such as to be recognized by a receiver as modulation by a repetitive waveform modulation signal.

Figure 1:
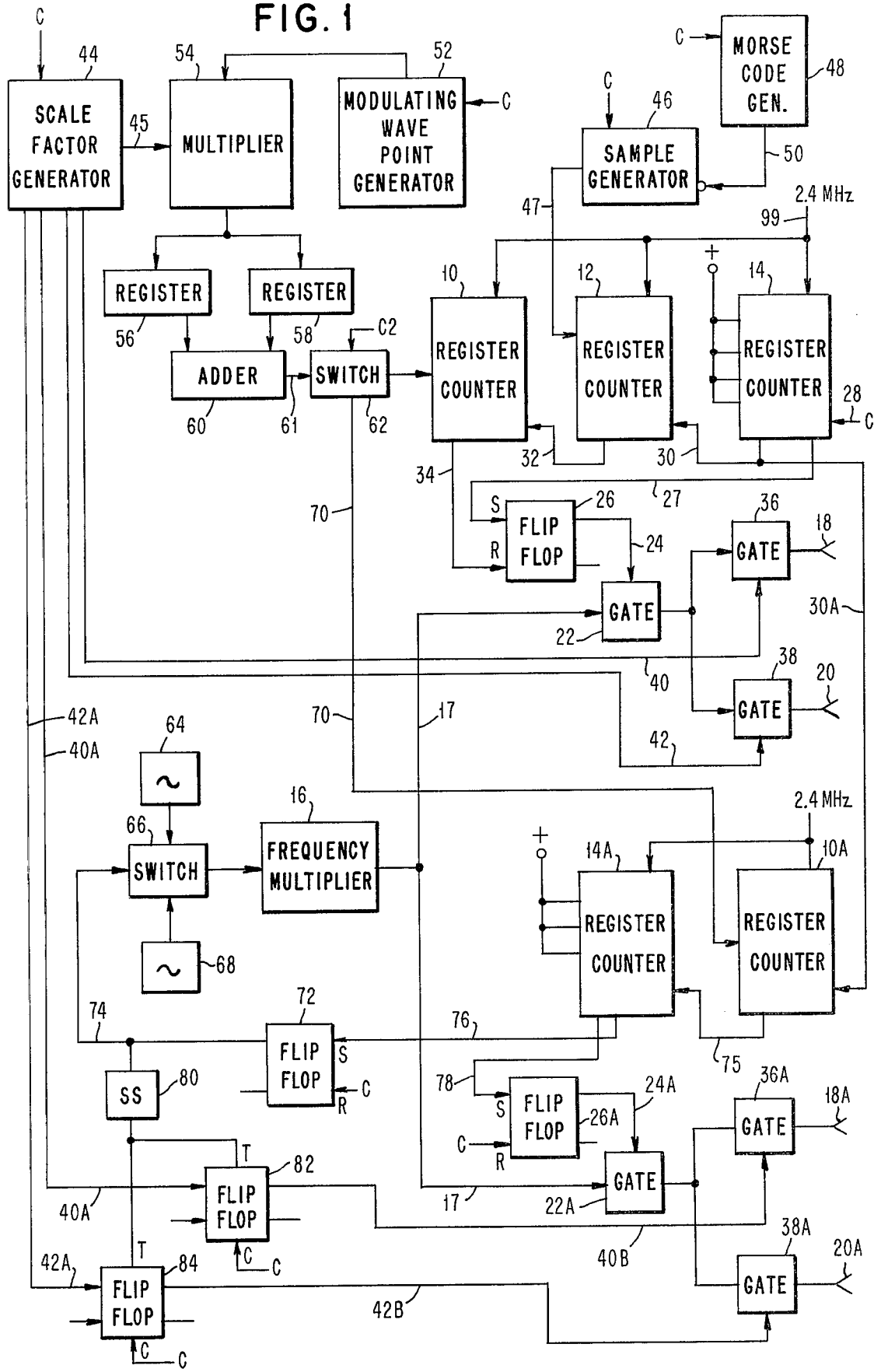
FIG. 1 is a schematic circuit diagram illustrating apparatus for carrying out the present invention.

Referring to FIG. 1, digital point values are successively stored in the combination of registers 10, 12, and 14. These three registers may sometimes be hereinafter referred to as constituting a single register since the total of the digital values stored in these three registers is used to modify the signal emitted from a radio frequency source 16 before the radio frequency energy is radiated from antennas 18 and 20.

In the preferred form of this apparatus, the registers 10, 12, and 14 are in the form of register counters, and they control the radio frequency energy from a source 16 on connection 17 by gating that energy through a digital gating device 22 in bursts of radio frequency energy. The duration of each burst is determined on the basis of the sample point value stored in the registers 10, 12, and 14. The timing gate on of the bursts of radio carrier frequency energy provides a pulse duration modulation of each burst of radio frequency energy for each different sample point value. In this manner, a series of bursts of carrier waves are supplied to each transmitter antenna, and the combined and integrated lengths of the samples provided by the different carrier bursts are seen and detected by a receiver as modulation information. The gate 22 is opened, or enabled, by an enabling connection 24 from a flip-flop 26 when that flip-flop is set by an output from register counter 14 on connection 27 to the set input of flip-flop 26. A clock signal C is supplied on connection 28 to commence a count down of the register counter 14. The output from counter 14 on connection 27 to set flip-flop 26 occurs very soon after the commencement of the count down of register 14. In a preferred embodiment, this interval is about 5 microseconds. Thus, 5 microseciconds after the clock signal C, flip-flop 26 is set, and gate 22 is enabled to pass the carrier frequency to the antennas 18 and 20. When the register counter 14 is counted down to 0, a consequent O output is carried by a connection 30 to commence the count down operation of the register counter 12. When that register counter counts down to 0, there is a consequent output on connection 32 to commence the count down of register counter 10. Finally, when the register counter 10 counts down to zero, the resultant output on a connection 34 resets the flip-flop 26, disabling the carrier gate 22 and ending the burst of carrier energy. Thus, the length of the burst of carrier energy gated through gate 22 is determined by the sum of the digital values initially stored in register counters 10, 12, and 14, minus the initial count down of register counter 14 to production of the gate-enabling output on connection 27. A clocking signal, which may be at 2.4 MHz is continuously supplied at connection 99 to all of the register counters 10, 12, 14 to determine the count down rate.

Successive bursts of carrier energy controlled by successive sample point values stored in register counters 10-14 may be switched in an alternating sequence to the different antenna elements 18 and 20 by means of gates 36 and 38 controlled by signals on lines 40 and 42 obtained from a scale factor generator circuit 44. In the preferred embodiments of the invention, four to six or more of the antenna elements 18 and 20 may be provided which serve to set up a so-called "scanning beam"pattern. Only two antennas are illustrated in FIG. 1 in order to simplify the presentation of the overall system. By coordinating the commutation of the carrier signal bursts by the gates 36 and 38 with the switching by gate 22 determining the length of individual bursts, it is possible to provide a very neat, simple, and economical method for producing a scanning beam from a single radio frequency source 16.

In a preferred form of the invention, the limit of the depth of modulation is effectively determined by providing for the storage of a predetermined fixed number in the register counter 14 in every cycle of operation. The number then counted down from output 27 to output 30 represents a fixed minimum value for transmission of the radio frequency wave for each sample point. The depth of modulation is also determined by the maximum range of combined sample point count values stored in register counters 10 and 12.

In the register counter 12, the successive sample points which are stored represent different points of a tone signal wave obtained on connection 47 from a modulating wave sample point generator 46. The generator 46 constitutes basically a digital memory which stores the different values of the sample points and which is addressed to deliver the different sample points successively in response to successive sample rate clock signals C. Information is added to the signals from the sample point generator 46 supplied to register counter 12 by means of a Morse code signal generator 48. Through a connection 50, the Morse code signal generator starts and stops the modulating wave sample point generator 46 to thereby add Morse code signals to the tone resulting from the different sample points supplied by generator 46. In a navigation control system, the combination of Morse code signals supplied by the Morse code signal generator may be repeated continuously to identify the particular station from which the navigation signals are being supplied.

Varying sample point count values are also supplied to the register counter 10 by a combination of circuit elements including a modulating wave sample point generator 52, the scale factor generator 44, a multiplier 54, registers 56 and 58, and an adder circuit 60.

The sample point generator 52 comprises essentially a read-only memory which is capable of providing digital numbers signifying sample point values for two or more signal waves. In a preferred form of the invention which is employed for an instrument landing system, these sample point values preferably represent 90 and 150 Hz waves. In a typical operation of the system, a sample point value for one wave, such as the 90 Hz wave, is first supplied from the generator 52 to the multiplier 54. Concurrently a scale factor is supplied from the scale factor generator 44 at connection 45 to the multiplier 54 indicating what proportion of the modulation to be controlled by the number to be stored in register counter 10 is to be representative of the 90 Hz wave. The multiplier 54 then multiplies the sample point obtained from generator 52 by the scale factor obtained from scale factor generator 44 and stores the resultant number in register 56. In the same cycle of operation, the sample point generator 52 next supplies a sample point number representative of a point value of the other one of the modulating waves, such as the 150 Hz wave, to the multiplier 54. Concurrently, the scale factor generator 44 provides to the multiplier a scale factor representing a complement of the value previously supplied to the multiplier 54 to indicate the proportion of the modulation to be stored in register counter 10 which is to be attributable to the 150 Hz wave. The result of that multiplication is stored in the register 58. The numbers stored in the registers 56 and 58 are then added in the digital adder 60 and the sum is supplied on connection 61 through a switch 62 and stored in the register counter 10. The timing of the operations of the system is such that all of the computations just described for the 90 Hz and 150 Hz sample point values can be carried out for each value to be stored in register counter 10 while the fixed count register counter 14 is counting down in the initial stages of the operation for the corresponding point.

The scale factor generator 44 typically provides different sets of scale factors respectively for determining the modulation sample point values for the signals to be delivered on the different antennas 18 and 20. Thus, the delivery of scale factor values by generator 44 is coordinated with the delivery by that generator of antenna selection gating signals on lines 40 and 42. If a change is desired in the mixtures of the 90 and 150 Hz modulation signals supplied on the different antenna elements 18 and 20, then it is necessary only to change the scale factors supplied from the scale factor generator, and every other part of the system remains the same as before.

The system as thus far described in FIG. 1 is substantially identical to the system described in connection with FIG. 1 of U.S. Pat. No. 3,793,597 issued Feb. 19, 1974, and the details of the structure of the present system are preferably carried out in accordance with the details shown and described in that prior patent.

The ratio frequency source 16, the source of the carrier frequency, may preferably constitute a frequency multiplier to which there is connected a crystal oscillator 64 through a switch 66. Thus, the radio frequency source really includes the oscillator 64 and the switch 66 as well as the frequency multiplier 16.

In accordance with the present invention, a second radio carrier frequency may be supplied by providing a second crystal oscillator 68 having a different oscillator frequency which may be alternatively switched through switch 66 to the frequency multiplier 16 to thus provide a different radio carrier frequency.

The system as described thus far is particularly well adapted for providing synthesized modulated radio carrier frequencies in the microwave range for azimuth guidance of aircraft in an instrument landing system. In accordance with the present invention, a combined system is provided for producing a synthesized modulated second carrier which may be used advantageously, for instance, for the glide slope function in a microwave instrument landing system.

In order to use a common source of radio carrier frequency energy including a common multiplier 16, and in order to employ other common elements of the system in order to produce multiple carrier modulation synthesis with different modulation functions on each carrier, the system is arranged to provide the bursts of the second carrier during the intervals between the bursts of the first carrier.

The second carrier is supplied through gate 22A, which determines the duration of the burst of the second carrier, and through the individually actuated antenna gates 36A and 38A, to the antenna elements 18A and 20A respectively. These elements are analogous to the similarly numbered elements previously described above. Again, while only two gates 36A and 38A, and two corresponding antenna elements 18A and 20A are disclosed, it will be understood that usually there will be more gates and more antenna elements, typically four such elements for the glide slope function in a preferred embodiment.

The register counter 10A operates similarly to register 10 in storing combined point values preferably representing a combination of 90 and 150 Hz modulation waves, for instance, which are typically employed as the modulation frequencies in glide slope systems. These sample point values are supplied, in the manner as previously described for storage in register 10, from the modulating wave point generator 52, the multiplier 54, the registers 56 and 58, and the adder 60 in conjunction with the operation of the scale factor generator 44. Normally, the switch 62 is enabled to send the sample point value information on connection 61 directly to register counter 10. However, during an intermediate time of the basic clock interval C, which is designated C2, the clock operates switch 62 to send the output of the adder 60 on connection 61 to connection 70 for storage in register counter 10A. This is on a separate cycle of operation of the sample point generating components 44, 52-60, after the storage of the previously described sample point value in register counter 10. At the beginning of a clock interval, the basic clock signal C is supplied to the reset input connection of a flip-flop 26A. This disables the gate 22A through connection 24A so as to end any burst of second carrier energy which is being supplied through gate 22A to antenna elements 18A or 20A. The same basic clock signal C is connected also to the reset input of a flip-flop 72, to remove any switch-enabling signals supplied from flip-flop 72 on connection 74 to the crystal oscillator switch 66. Crystal oscillator switch 66 is designed to connect the first carrier frequency crystal oscillator 64 through to the frequency multiplier 16 in the absence of a switching signal on connection 74. However, in the presence of a switching signal on connection 74, switch 66 switches over to disconnect oscillator 64, and to connect crystal oscillator 68 to the frequency multiplier 16 to thereby provide the second radio carrier frequency.

Since the bursts of the first carrier, and of the second carrier, occurred during mutually exclusive intervals, the second carrier must be held off during the interval while the first carrier is on. Accordingly, the entire interval of count down of the fixed interval register counter 14 is used as an initial interval during which the second carrier is held off and prevented from being transmitted. At the end of the count down of register counter 14, the resultant output on connection 30 from that register counter is supplied through a branch connection 30A to register counter 10A as a starting signal for initiating the count down of that register. After register counter 10A is counted down, an output signal is transmitted on a connection 75 to the associated fixed count storage register counter 14A. The initiation of transmission of the next burst of the second carrier energy is then held off by the additional interval corresponding to the fixed number stored in register counter 14A. The sum of counts stored in 10A and 14A always equals or exceeds the combined count values stored in register counters 10 and 12, so that register counters 10A and 14A never count out completely to initiate the second carrier frequency burst before the end of the first carrier frequency burst.

Near the end of the count down operation of register counter 14A, that register counter emits a signal on an output connection 76 to the set input of flip-flop 72. This occurs typically at about five microseconds from the end of the count down of register counter 14A, and after the end of the count down of register 10 which ends the longest duration of the burst of the first carrier through gate 22. The setting of flip-flop 72 provides a switching signal on connection 74 to the oscillator switch 66 which connects oscillator 68 to frequency multiplier 16 and disconnects oscillator 64. Thus, the radio carrier frequency source begins operation at the second carrier frequency.

The signal on the output connection 74 of flip-flop 72 is also supplied to a single shot (monostable multivibrator) circuit 80, and from there to the trigger inputs of two trigger type flip-flops 82 and 84. Flip-flops 82 and 84 are provided with enabling signals from the scale factor generator 44 on connections 40A and 42A for designating which antenna gate is to be enabled. Depending upon the signals on 40A and 42A, one or the other of the triggered flip-flops 82 and 84 is set, when triggered from circuit 80, to provide a gate enabling signal on the corresponding connections 40B and 42B to one of the antenna gates 36A and 38A. The additional switching function provided by the triggered flip-flops 82 and 84 is required for selecting the designated antenna for the second signal carrier because of the fact that the starting interval for the second carrier burst is variable, and is not determined by the scale factor generator 44.

Finally, at the end of the count down of register 14A, an output signal appears at connection 78 to the set input of flip-flop 26A. This results in an enabling output on connection 24A to gate 22A to commence the burst of the second radio carrier frequency energy to one of the antennas 18A and 20A. This burst continues through the entire remaining off period of the first carrier until the next basic clock pulse is received by the reset input of flip-flop 26A, and the count down of register counter 14 is again initiated. As previously mentioned above, flip-flop 72 is also reset by a basic clock pulse to cause the radio frequency carrier source to switch back to the first carrier frequency. Then, after the initial brief count down interval of register counter 14, flip-flop 26 is set to again enable gate 22 to provide a burst of first carrier energy on antenna 18 or antenna 20. In this manner, alternating bursts of the first carrier energy and of the second carrier energy are supplied on the antennas 18-20 and the antennas 18A-20A respectively. In each switch-over of the radio carrier frequency source from one carrier frequency to the other, there is a minimum interval of approximately five microseconds to enable the new combination of oscillator and frequency multiplier to "settle down" in producing the new carrier frequency before the corresponding gate 22 or 22A is enabled.

It is apparent from the above explanation, that in this preferred form of the invention, pulse duration modulation is employed for both the first radio carrier frequency which is gated through gate 22, and the second radio carrier frequency which is gated through gate 22A. It has been found that the modulation information is quite adequate for the receiver if the duration of each burst of carrier frequency is controlled only at the beginning or at the end of the burst. Thus, the first radio carrier frequency gated through gate 22, in this preferred embodiment, always begins in a burst which is initiated by the initial count down of register counter 14 at approximately five microseconds after the basic clock pulse C. However, the burst of energy terminates in a variable interval determined by the numbers stored in the register counters 10 and 12. On the other hand, the second radio carrier frequency bursts have a variable initiation time in relation to the basic clock pulse depending on the interval of time during which gate 22A is held off by the count down of register counter 10A, as determined by the sample point value stored in that counter. However, the second radio carrier frequency pulse always ends at a fixed time corresponding to the basic clock pulse of the system which resets flip-flop 26A.

Figure 2:
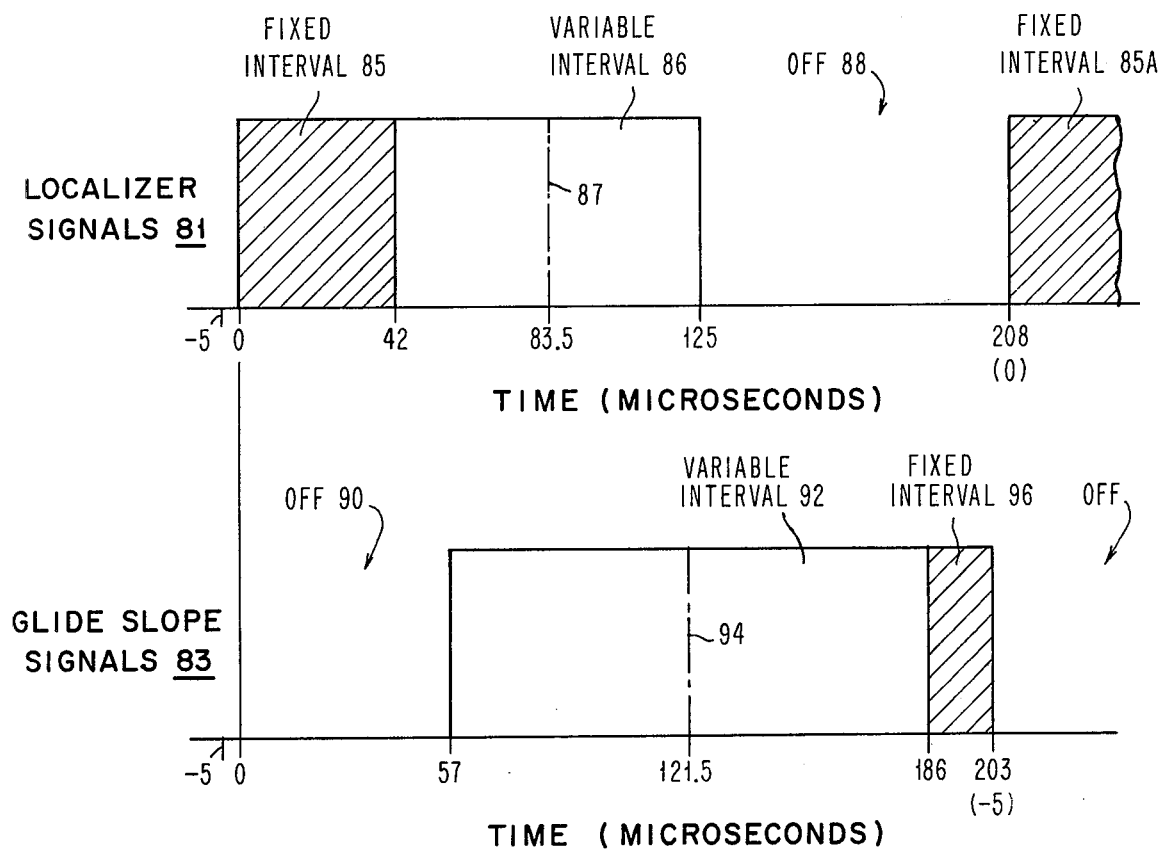
FIG. 2 is a graphic representation illustrating the nature of the outputs of the apparatus of FIG. 1, and the timing intervals involved in those outputs.

FIG. 2 illustrates the pulse duration modulation timing intervals in a graphic form. Assuming that the first radio carrier frequency bursts of energy are used as localizer signals in an aircraft instrument landing system, the first radio carrier frequency signals are labelled in FIG. 2 as "localizer signals 81". Similarly, assuming the second radio carrier frequency signals are to be used for the glide slope function in an instrument landing system, those signals are labeled as "glide slope signals 83". Thus, a separate horizontal bar chart is shown for each class of signals, but the horizontal scale, a time scale shown in microseconds, is a common scale for the two bar charts.

In the localizer signals bar chart 81, the time of the basic clocking interval clock pulse C is indicated at "5" at the left extremity of the time scale. This corresponds to five microseconds before the beginning of the fixed interval of each burst of the first radio carrier frequency. The beginning of the fixed interval of that burst, shown at 85, is at zero microseconds. That corresponds to the timing of the output on connection 27 from the fixed counter 14 to set the flip-flop 26 and enable the gate 22. The fixed interval 85 continues to 42 microseconds, when the fixed register counter 14 counts out, and provides an output at connection 30 to the register counter 12. Depending upon the counts stored in registers 10 and 12, the burst of the first radio carrier frequency energy continues for a variable interval 86 lasting for a maximum time which may continue to the 125th microsecond. This corresponds to the final count down of register counter 10, and the resultant output on connection 34 which resets flip-flop 26 and terminates the enablement of gate 22. The first radio carrier is then off for a minimum fixed interval indicated at 88, to the period ending at 208 microseconds (from "0"), at which time the fixed interval 85 begins again, as indicated at 85A. Thus, the complete basic cycle, in this preferred example, is 208 microseconds. Therefore, 208 microseconds corresponds to zero microseconds in a new basic cycle of operation. The median value of the variable interval, corresponding to the zero crossover sample point value is indicated at 87 at time 83.5 microseconds.

The glide slope signals 83 (from the second radio frequency carrier) are indicated in the second bar chart for the corresponding basic interval just described above for the localizer signals. Thus, there is first an off period 90 which may be said to begin at minus five microseconds, and continues to 57 microseconds. This corresponds to the entire count down interval of the register counter 14 plus a minimum 15 microsecond count down of the register counter 14A before the gate 22A of FIG. 1 is enabled.

Additionally, there is a variable interval 92 which depends upon the count stored within the register counter 10A, and which may begin as early as the fifty-seventh microsecond, and end as late as the one hundred eighty-sixth microsecond. The center line value, indicated at 94, indicating a zero crossover sample point value is at 121.5 microseconds. The variable interval 92 is followed by a fixed interval 96 which begins at the one hundred eighty-sixth and ends at the two hundred third microsecond time. This represents the minimum interval during which the second radio carrier frequency (for the glide slope) is always on. This fixed interval is determined by combination of the fixed count stored in 14A and the maximum value which may be stored in register counter 10A, holding off the second radio carrier for the maximum interval. The fixed interval is ended by the basic clock pulse C arriving at the reset input of flip-flop 26A at the two hundred third microsecond time to remove the enabling signal from gate 22A. This corresponds to the minus five microsecond time, and is the beginning of a new complete cycle of operation. Thus, five microseconds later, the fixed interval 85A for the first radio carrier begins.

It will be observed from the above description that there is a substantial overlap between the varible intervals 86 and 92 of the respective first and second carrier frequencies which may be used for the localizer and the glide slope functions respectively. It is not immediately apparent that this overlap is permissible, because obviously the two carriers cannot both be on at the same time if a single radio frequency source is employed. However, where fixed, predetermined, modulation frequencies are employed, as in the conventional modulations for both the localizer and glide slope signals in an instrument landing system, and where the same modulation frequencies are employed for both the localizer and glide slope functions, this overlap can be accommodated by designing and programming the system to provide for the modulation sample values for the modulation frequencies to be 180° out of phase for the two different functions. Thus, the conventional modulation frequencies for both localizer and glide slope functions are 90 and 150 Hz. Therefore, by providing that the 90 Hz sample point values provided from the modulating wave point generator 52 for the glide slope are 180° out of phase with the corresponding 90 Hz sample points provided to register 10 for the localizer function, the sample point components for the variable intervals 86 and 92 are always complementary. Thus, when the 90 Hz sample for variable interval 86 calls for a long interval, the corresponding 90 Hz component in the variable interval 92 calls for a corresponding short interval. By providing exactly the same 180° out of phase relationship for the 150 Hz sample points supplied for the respective localizer and glide slope functions at the two different radio carrier frequencies, the same complementary relationship is maintained with respect to the 150 Hz components of the variable intervals 86 and 92. Accordingly, there is never an actual overlap between actual sample values despite the time-sharing of the two variable intervals in their respective maximum durations.

The overlap of the variable intervals for transmission of the two carriers is most easily and clearly accommodated when the modulation tones for the two carriers are identical. However, it is also obvious that a considerable overlap of the variable intervals may be accommodated if the modulation for one carrier is a low even harmonic frequency of the modulation frequency for the other carrier so that the peaks and valleys of the modulation waves can be fitted together in a complementary manner. For instance, the modulation frequency for one carrier may be the third harmonic of a modulation frequency for the other carrier, with the phase relationship of the two modulating waves being such that when a maximum duration sample (corresponding to a modulation wave peak) is required in the variable interval 92 by the fundamental frequency on the bar chart 83 in FIG. 2, a minimum duration sample is required for variable interval 86 on bar chart 81 by a valley in the third harmonic modulation wave. The phase relationship between the two modulation waves is maintained so that the peak of the fundamental always corresponds to a valley of the third harmonic. The "peak" and "valley" relationship is not always the complete answer. However, there is always a phase angle which will minimize overlap between pairs of members of a group including a fundamental and various harmonic frequencies. The required phase relationship is sometimes referred to hereinafter as an out-of-phase condition between the fundamental and the harmonic, or between harmonics, even though it is not conventional to speak of phase relationship in that manner between waves having different frequencies.

In accordance with the details explained in the prior related patent referred to above, the mixture of 90 and 150 Hz modulation presented to each antenna element 18, 20 is dependent upon the position of that element with respect to a predetermined guidance path. Thus, in the localizer, the modulation synthesis samples for antenna elements sending signals to the left of the guidance path have a predominance of 90 Hz modulation, telling the aircraft to turn to the right. Conversely, for antenna elements transmitting scanning beam components to the right of the guidance path, the 150 Hz modulation predominates. Similarly, in the guide slope, for those antenna elements directing portions of the guidance signals above the predetermined guidance path, the predominant modulation frequency is 90 Hz and for those below the guidance path, the predominant modulation frequency is 150 Hz. Accordingly, in the use of this combination modulation synthesis method and apparatus of the present invention, and with the overlapped variable intervals, it is important that the directions of scan should be coordinated for the localizer and glide slope so that as the localizer is scanned to the left of the guidance path, the glide slope is scanned above the guidance path so that both the localizer and glide slope signals have predominant 90 Hz modulation during the same shared modulator operation clock interval. Similarly, when the localizer is scanned to the right of the guidance path, the glide slope should be scanned below the guidance path so that both have predominant 150 Hz modulation. In this manner, the out of phase relationship of the modulation samples provided for the two different radio frequency carriers is fully effective.

While the overlapped variable intervals discussed immediately above are preferred in carrying out the present invention, it is obvious that the principles of the invention can be followed and employed without a variable interval overlap, and without such overlap, non-matched modulation frequencies may be employed for the first and second carriers.

Furthermore, while pulse duration modulation is specifically disclosed, it will be apparent that fixed length bursts of the two carriers can be alternated, and a digital attenuator may be employed to amplitude modulate the energy of each burst of carrier. Alternatively, phase modulation may be applied to each burst of carrier.

In a preferred embodiment and application of the invention, the invention is used for a C band microwave instrument landing system transmitting signals which are compatible with the conventional VHF-UHF instrument landing system signals. Thus, both the first and second carriers are transmitted at carrier frequencies which are within the C band range from 5,000 MHz to 5,250 MHz, a band of frequencies presently assigned for navigation purposes. The actual frequency difference between the first carrier frequency used for the localizer, and the second carrier frequency used for the glide slope corresponds exactly to the frequency difference between the conventional VHF localizer at 108 to 112 MHz and the conventional UHF glide slope at 328.6 to 335.4 MHz. For instance, the localizer carrier signals may be transmitted at 5,006.3 MHz and the glide slope at 5.227.5 MHz. Thus, when received and converted by subtraction of the same subtraction frequency, the difference frequency for the localizer signals may correspond exactly to a conventional localizer frequency, and the corresponding difference frequency for the glide slope may correspond exactly to a conventional glide slope frequency. The exact frequency relationships may be carried out in accordance with the teachings of U.S. Pat. No. Re. 28,762, reissued Apr. 6, 1976 by Donald J. Toman for a RADIO NAVIGATIONAL AID WITH SEPARATE STANDARD FREQUENCY.

While a single source (16,64,68) of carrier frequencies is preferred in carrying out the invention, it is obvious that completely separate carrier frequency sources may be employed. Furthermore, other means may be employed for obtaining the two carriers from the same source, such as changing the multiplication factor of the multiplier, instead of changing input oscillators.

While only two different modulated carriers are produced in the illustrated embodiment, it is obvious that more than two could be produced in accordance with the invention.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method for synthesizing the production of modulated radio carrier waves from at least two radio carriers including
continuously storing the same group of different digital sample point values signifying various modulation levels required for each of said radio carriers at successive points in time to suggest the presence of at least one modulation signal waveform for each of said carriers, gating the first of said carriers on and off, gating the second of said carriers on only during the off periods of the first carrier, reading out said sample point values in timed sequence, transferring and applying said digital sample point values to modify said carrier waves in timed sequence by modification of each carrier by one sample point value during each period when each carrier wave is gated on to thus produce modified carriers, the modifications of each of said carriers being such as to be recognized by a receiver as modulation by a respective waveform modulation signal.

2. A method as claimed in claim 1 wherein the modification of said carriers is accomplished by controlling the on and off gating of each carrier to thus provide a variation in the on period for each carrier to thereby establish a pulse duration modulated carrier signal for each carrier.

3. A method as claimed in claim 2 wherein each modulation frequency for one of said carriers is the same as, or is a low even harmonic of a modulation frequency for the other one of said carriers.

4. A method as claimed in claim 3 wherein the modulation of the first of said carriers is carried out by control and variation of the gating off time of each burst of said first carrier to thereby impart pulse duration modulation thereto, and wherein the modification of the second of said carriers is carried out by controlling and varying the gating on time of each burst of said second carrier to thereby impart pulse duration modulation thereto.

5. A method as claimed in claim 4 wherein the ranges of variation of the gating off time for said first carrier and the gating on time for said second carrier have a substantial overlap, and the sample points representative of the modulation waves for the two carriers have an out of phase relationship so that the peak energy sample point values for one carrier correspond to minimum sample point values for the other carrier.

6. A method as claimed in claim 1 wherein the modification of each carrier wave is carried out by varying the attenuation of the carrier wave by amounts determined by the sample point values to thereby establish an amplitude modulated carrier signal for each carrier.

7. A method as claimed in claim 1 including the additional step of modifying the sample point values during transfer to insert additional signal information therein prior to application of those point values to modify the carrier signals.

8. A method as claimed in claim 7 wherein the modification is carried out by multiplying each sample point value by a scale factor.

9. A method as claimed in claim 8 wherein the modification of the sample point values consists of storing and reading out a second plurality of different sample point values for each carrier in step with the reading out of the first-mentioned plurality of sample point values, and modifying the first-mentioned plurality of sample point values by combining corresponding individual point values of the second plurality of sample point values with the individual point values of the first-mentioned plurality of sample point values to provide combined sample point values.

10. A method as claimed in claim 9 wherein the combination of individual members of the first plurality of sample point values with the individual members of the second plurality of sample point values is carried out by an arithmetic addition of the point values.

11. A method as claimed in claim 9 wherein said first and second plurality of different sample point values for each carrier corresponds to two different modulation frequencies for each carrier.

12. Apparatus for synthesizing the production of modulated radio carrier waves from at last two radio carriers comprising storage means for continuously storing the same group of different digital values corresponding to a plurality of different sample points signifying various modulation levels required at successive points in time to suggest the presence of at least one modulation signal waveform for each of said carriers, a source of carrier waves for each of said carriers, means for gating the first of said carriers on and off, means for gating the second of said carriers on and off, said means for gating said second carrier being operable to gate said second carrier on only during the off periods of said first carrier, means for reading out said sample point values in timed sequence, means for transferring the means for applying said point values to modify said carrier waves in timed sequence by modification of each carrier by one sample point value during each period when each carrier wave is gated on to thus produce modified carriers, the modifications of each of said carriers being such as to be recognized by a receiver as modulation by a repetitive waveform modulation signal.

13. Apparatus as claimed in claim 12 wherein said means for applying said point values to modify said carrier waves includes said gating means operable to gate said carriers on and off, said means for applying said point values and said gating means being operable to gate said carriers on and off for periods proportional to the sample point values to thereby establish pulse duration modulated carrier signals for both of said carriers.

14. Apparatus as claimed in claim 13 including at least one register counter means for storing each sample point value for said first carrier after it is read out of said storage means, said register means being operable to count down to zero over a period determined by the digital sample point value stored therein commencing with a clock signal, said register counter means being connected to control said gating device to provide a first gating device to provide a first gating state during the counting down operation of said register counter means and to provide a second gating state after the counting down operation has been completed to thereby gate the first carrier on and off.

15. Apparatus as claimed in claim 14 including a second register counter means for storing each sample point value for said second carrier after it is read out of said storage means, said second register counter means being operable to count down to zero over a period determined by the sample point value stored therein, said second register counter means being connected to control said gating device for said second carrier to provide a first gating state during the counting down operation of said second register counter means and to provide a second gating state after the counting down operation has been completed to thereby gate said second carrier on and off.

16. Apparatus as claimed in claim 12 wherein
said means for transferring said point values includes means for modifying the sample point values to insert additional signal information therein prior to application to said carrier wave modifying means.

17. Apparatus as claimed in claim 16 wherein
said modifying means comprises means for multiplying each sample point value by a scale factor.

18. Apparatus as claimed in claim 16 wherein
said sample point value modification means comprises means for storing and reading out a second plurality of different sample point values for each of said carriers in step with the reading out of the first mentioned plurality of sample point values, and means for combining individual point values of the second plurality of sample point values with the individual point values of the first mentioned plurality of sample point values to provide the combined sample point values.

19. Apparatus as claimed in claim 18 wherein
said combining means comprises an adder.

20. Apparatus as claimed in claim 19 wherein
said modifying means includes a multiplier for multiplying each member of said first mentioned plurality of sample point values by a first scale factor and for multiplying the corresponding member of the second plurality of sample point values by a second scale factor which is a complement of said first scale factor before addition of each pair of individual members of said first and second plurality of sample point values.

21. Apparatus as claimed in claim 12 wherein said apparatus includes
a single radio frequency source for alternative generation of said first and second signal carrier frequencies, said radio frequency source including switching means for switching the operation of said radio frequency source to produce either said first carrier frequency or said second carrier frequency.

22. Apparatus as claimed in claim 21 wherein
said single carrier frequency source comprises a common frequency multiplier and two different crystal oscillators which are operable at different oscillator frequencies which are switched to said frequency multiplier to provide said first and second carrier frequencies respectively.

23. Apparatus as claimed in claim 12 including
timed gating means and antennas connected to said timed gating means for connecting said first and second carriers selectively to said antennas for transmission of said carriers as navigational aid signals.

* * * * *

UNITED STATES PATENT AND TRADEMARK OFFICE
CERTIFICATE OF CORRECTION

PATENT NO. : 4,037,173
DATED : July 19, 1977
INVENTOR(S) : DONALD J. TOMAN

It is certified that error appears in the above-identified patent and that said Letters Patent are hereby corrected as shown below:

Column 2, line 16, --sample-- should be inserted after "digital"
         line 18, "somtimes" should read --sometimes--
         line 31, "timing gate" should read --timed gating--
         line 48, "microsecionds" should read --microseconds--
Column 4, line 42, "ratio" should read --radio--
Column 5, line 16, --sample-- should be inserted after "combined"
Column 8, line 32, "varible" should read --variable--
Column 11, line 16, "respective" should read --repetitive--
Column 12, line 18, "last" should read --least--
Column 12, line 63, "device to provide a first gating" should be omitted.

Signed and Sealed this

Twenty-first Day of March 1978

[SEAL]

Attest:

RUTH C. MASON
Attesting Officer

LUTRELLE F. PARKER
Acting Commissioner of Patents and Trademarks